United States Patent
Rosenthal et al.

(10) Patent No.: US 7,543,280 B2
(45) Date of Patent: Jun. 2, 2009

(54) CONVERTING AND EXECUTING APPLICATIONS

(75) Inventors: Arndt Rosenthal, Rauenberg (DE);
Gilles Berthelot, Mannheim (DE);
Christof Engel, Wiesloch (DE);
Joachim Otto, Heidelberg (DE); Ingo Helbig, Forst (DE)

(73) Assignee: SAP AG, Walldorf (DE)

( * ) Notice: Subject to any disclaimer, the term of this patent is extended or adjusted under 35 U.S.C. 154(b) by 717 days.

(21) Appl. No.: 10/658,593

(22) Filed: Sep. 8, 2003

(65) Prior Publication Data
US 2005/0055699 A1   Mar. 10, 2005

(51) Int. Cl.
*G06F 9/44* (2006.01)
(52) U.S. Cl. .................. 717/137; 717/106; 717/136; 719/313
(58) Field of Classification Search .................. 717/137
See application file for complete search history.

(56) References Cited

U.S. PATENT DOCUMENTS

| | | | |
|---|---|---|---|
| 6,449,617 B1 * | 9/2002 | Quinn et al. | 707/100 |
| 6,961,932 B2 * | 11/2005 | Mishra et al. | 717/136 |
| 7,003,482 B1 * | 2/2006 | Margoscin et al. | 705/35 |
| 7,007,278 B2 * | 2/2006 | Gungabeesoon | 719/311 |
| 2002/0178290 A1 * | 11/2002 | Coulthard et al. | 709/246 |
| 2003/0135543 A1 * | 7/2003 | Kittredge et al. | 709/203 |
| 2003/0217191 A1 * | 11/2003 | Gao et al. | 709/320 |

OTHER PUBLICATIONS

Doppelhammer, Jochen et al. "Database Performance in the Real World: TPC-D and SAP R/3." Proceedings of the 1997 ACM SIGMOD International Conference on Management of Data. ACM Press: Jun. 1997, pp. 123-134.*

* cited by examiner

*Primary Examiner*—Michael J. Yigdall
(74) *Attorney, Agent, or Firm*—Finnegan, Henderson, Farabow, Garrett & Dunner, L.L.P.

(57) ABSTRACT

Techniques for converting and executing applications. The techniques include receiving run-time code generated from a converted design-time representation of an application, wherein the converted design-time representation of the application is generated from an original design-time representation of the application developed for use in a first run-time environment for executing applications developed in a first design-time environment, the first design-time environment using a first programming model comprising one or more first model elements including screens and processing logic for each screen, and wherein the converted design-time representation of the application is for use in a second run-time environment for executing applications developed in a second design-time environment, the second design-time environment using a second programming model comprising one or more second model elements including models, views, and controllers; and executing the run-time code in the second run-time environment using an adapter to interface with the first run-time environment.

14 Claims, 12 Drawing Sheets

PROCESS AFTER INPUT.

FIELD trdyse01cm-username
      MODULE check_username.

MODULE export_ok_code.
   CALL SUBSCREEN tabstrip_container.

CHAIN.
      FIELD:   trdyse01cm-req_cust,
               trdyse01cm-req_wb,
               trdyse01cm-req_cop,
               trdyse01cm-req_move.
         MODULE check_types_trans.
   ENDCHAIN.

CHAIN.
      FIELD:   Trdyse01cm-sel_chan,
               Trdyse01cm-sel_rele.
         MODULE check_status_trans.
   ENDCHAIN.

CHAIN.
      FIELD:   Trdyse01cm-sel_rele,
               gv_datseltext.
         MODULE check_date_trans.
   ENDCHAIN.

```
METHOD process_after_input.
        WDP_FIELD TRDYSE01CM-USERNAME.
            WDP_MODULE CHECK_USERNAME.

WDP_MODULE EXPORT_OK_CODE.
        WDP_CALL_SUBSCREEN TABSTRIP_CONTAINER.

WDP_CHAIN.
            WDP_FIELD TRDYSE01CM-REQ_CUST.
            WDP_FIELD TRDYSE01CM-REQ_WB.
            WDP_FIELD TRDYSE01CM-REQ_COP.
            WDP_FIELD TRDYSE01CM-REQ_MOVE.
                WDP_MODULE CHECK_TYPES_TRANS.
        WDP_ENDCHAIN.

WDP_CHAIN.
            WDP_FIELD TRDYSE01CM-SEL_CHAN.
            WDP_FIELD TRDYSE01CM-SEL_RELE.
            WDP_MODULE CHECK_STATUS_TRANS.
        WDP_ENDCHAIN.

WDP_CHAIN.
            WDP_FIELD TRDYSE01CM-SEL_RELE.
            WDP_FIELD GV_DATSELTEXT.
                WDP_MODULE CHECK_DATE_TRANS.
        WDP_ENDCHAIN.
ENDMETHOD.
```

CONVERTING AND EXECUTING APPLICATIONS

BACKGROUND

The present invention relates to data processing by digital computer, and more particularly to converting and executing applications.

An application is one or more computer programs that perform a specified set of functionality for one or more users. Application functionality can include both the processing and presentation of data.

Application development typically involves creating a design-time representation of an application using a particular design-time environment and then using the design-time representation of the application to generate run-time code that is executable in a particular run-time environment. Both the design-time environment and the run-time-environment support the use of a particular programming model that defines the elements of the application and an application format that specifies how those elements are structured.

Once an application has been developed according to a certain application format, it may be difficult to convert the application to accommodate a different run-time environment. In order to accommodate a different run-time environment, the application may need to be rewritten in a different application format.

SUMMARY OF THE INVENTION

The present invention provides methods and apparatus, including computer program products, for converting and executing applications.

In general, in one aspect, the invention provides methods and apparatus, including computer program products, for executing applications. A program according to this aspect is operable to cause data processing apparatus to perform operations comprising receiving run-time code for an application, the run-time code being generated from a converted design-time representation of the application, wherein the converted design-time representation of the application is generated from an original design-time representation of the application developed for use in a first run-time environment for executing applications having been developed in a first design-time environment, the first design-time environment using a first programming model comprising one or more first model elements including screens and processing logic for each screen, the original design-time representation including one or more application screens and original processing logic for each application screen, the original processing logic including a call to a run-time module in the first run-time environment, and wherein the converted design-time representation of the application is for use in a second run-time environment for executing applications having been developed in a second design-time environment, the second design-time environment using a second programming model comprising one or more second model elements including models, views, and controllers, the converted design-time representation including one or more application views based on the one or more application screens, and converted processing logic based on the original processing logic, the converted processing logic being capable of being executed in the second run-time environment; and executing the run-time code in the second run-time environment using an adapter operable to interface with the run-time module in the first run-time environment.

Advantageous implementations of the invention include one or more of the following features. The first programming model is the SAP DYNPRO™ ("Dynpro") programming model and the second programming model is the SAP WEB DYNPRO™ ("Web Dynpro") programming model. The original design-time representation of the application comprises original state control logic; and the converted design-time representation of the application comprises converted state control logic based on the original state control logic, the converted state control logic capable of being executed by the adapter. The original design-time representation of the application comprises one or more controls from a first set of controls; the converted design-time representation of the application comprises one or more controls from a second set of controls, each control in the converted design-time representation of the application corresponding to a control in the original design-time representation of the application; and executing the run-time code comprises rendering the controls in the converted design-time representation of the application. Executing the run-time code comprises using the adapter to perform a function not performed by the original processing logic. The function comprises input validation. The function comprises input formatting.

In general, in another aspect, the invention provides methods and apparatus, including computer program products, for executing applications. A program according to this aspect is operable to cause data processing apparatus to perform operations comprising a computer program product, tangibly embodied in an information carrier, the computer program product being operable to cause data processing apparatus to perform operations comprising receiving run-time code for an application; determining whether the run-time code was generated from a native design-time representation of the application or from a converted design-time representation of the application, wherein: the native design-time representation of the application is for use in a first run-time environment for executing applications having been developed in a first design-time environment, the first design-time environment using a first programming model comprising one or more first model elements including models, views, and controllers; and the converted design-time representation of the application is generated from an original design-time representation of the application developed for use in a second run-time environment for executing applications having been developed in a second design-time environment, the second design-time environment using a second programming model comprising one or more second model elements including screens and processing logic for each screen, the original design-time representation including one or more application screens and original processing logic for each application screen, the converted design-time representation including one or more application views based on the one or more application screens, and converted processing logic based on the original processing logic, the converted processing logic capable of being executed in the second run-time environment; and if the run-time code was generated from the native design-time representation, execute the run-time code in the first run-time environment using a set of run-time modules in the first run-time environment; and if the run-time code was generated from the converted design-time representation, execute the run-time code in the first run-time environment using a set of run-time modules in the second run-time environment.

Advantageous implementations of the invention include one or more of the following features. The first programming model is the SAP Web Dynpro programming model and the second programming model is the SAP Dynpro programming model. Executing the run-time code using the set of run-time modules in the second run-time environment comprises using an adapter in the first run-time environment to interface with the set of run-time modules in the second run-time environment. Executing the run-time code using the set of run-time modules in the first run-time environment comprises using a first sequence of process steps. Executing the run-time code using the set of run-time modules in the second run-time environment comprises using a second sequence of process steps.

The invention can be implemented to realize one or more of the following advantages. Applications designed in a first format for a first run-time environment can be converted into a second format and executed in a second run-time environment. The conversion can be automated. Using an adapter to interface between the two run-time environments eliminates the need to modify the run-time modules in the first run-time environment to work in the second run-time system. Using a conversion format with syntax that resembles the first format makes it easier for application developers that are used to the syntax of the first format to make modifications to the converted application. One implementation of the invention provides all of the above advantages.

The details of one or more implementations of the invention are set forth in the accompanying drawings and the description below. Further features, aspects, and advantages of the invention will become apparent from the description, the drawings, and the claims.

BRIEF DESCRIPTION OF THE DRAWINGS

FIG. 7A is an example of application flow logic before conversion.

FIG. 7B is an example of application flow logic after conversion.

Like reference numbers and designations in the various drawings indicate like elements.

DETAILED DESCRIPTION

Figure 1:
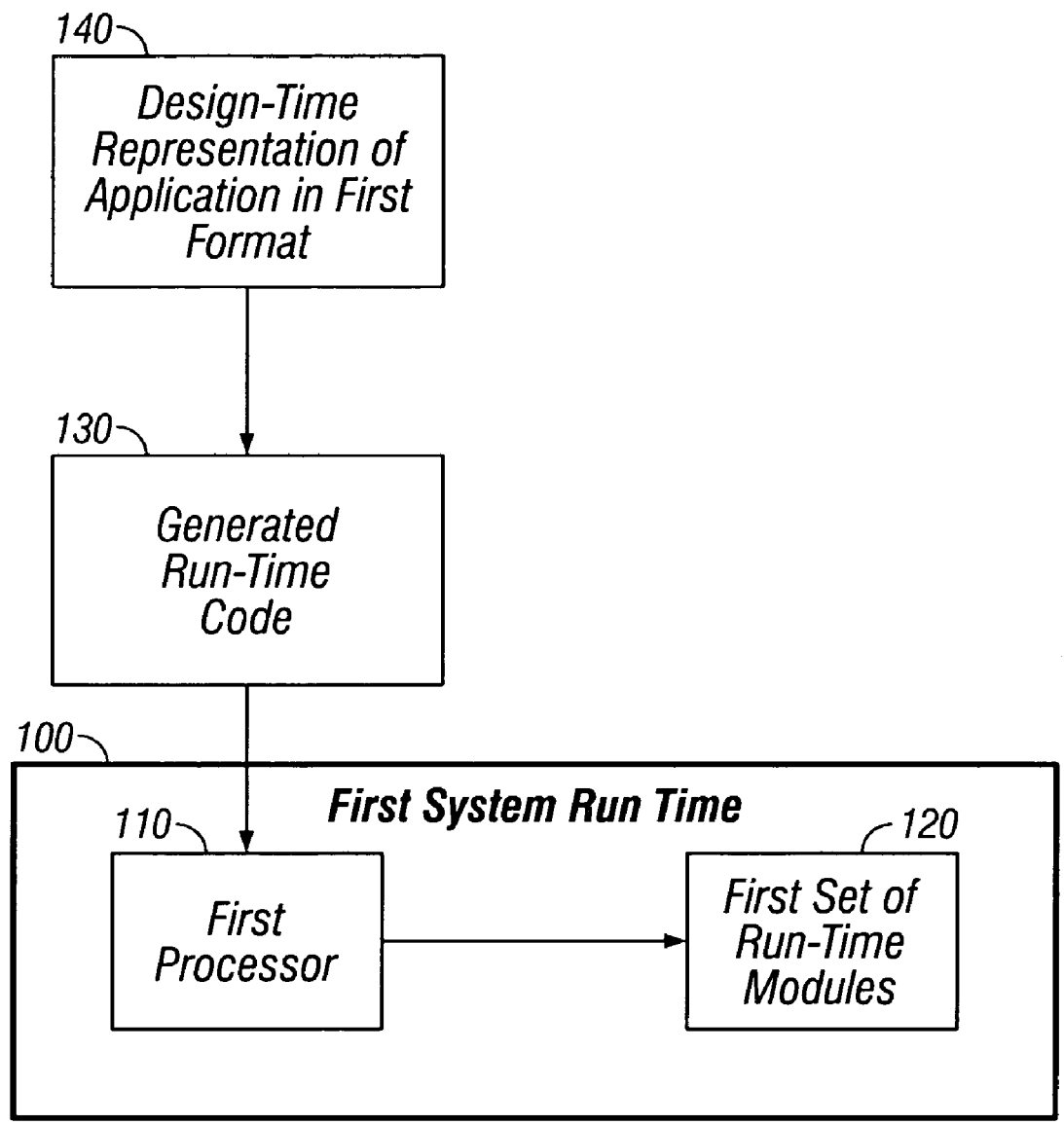
FIG. 1 is a block diagram of a first system in accordance with the invention.

As shown in FIG. 1, a first system 100 at run time includes a first run-time processor 110 and a first set of run-time modules 120. The first run-time processor 110 is operable to execute run-time code 130 generated based on a design-time representation of an application. The design-time representation is in a first application format 140. In one implementation, the first application format 140 is the Dynpro application format, developed by SAP AG of Walldorf, Germany ("SAP"). The Dynpro application format includes screens and associated processing logic, as explained in more detail below. Thus, in this implementation, the design-time representation of an application in the Dynpro format would include a specification of the application screens and the processing logic for those screens. During execution of the run-time code 130, the first run-time processor 110 can invoke the first set of run-time modules 120 to provide enhanced application functionality, for example, input validation and input formatting.

Figure 2A:
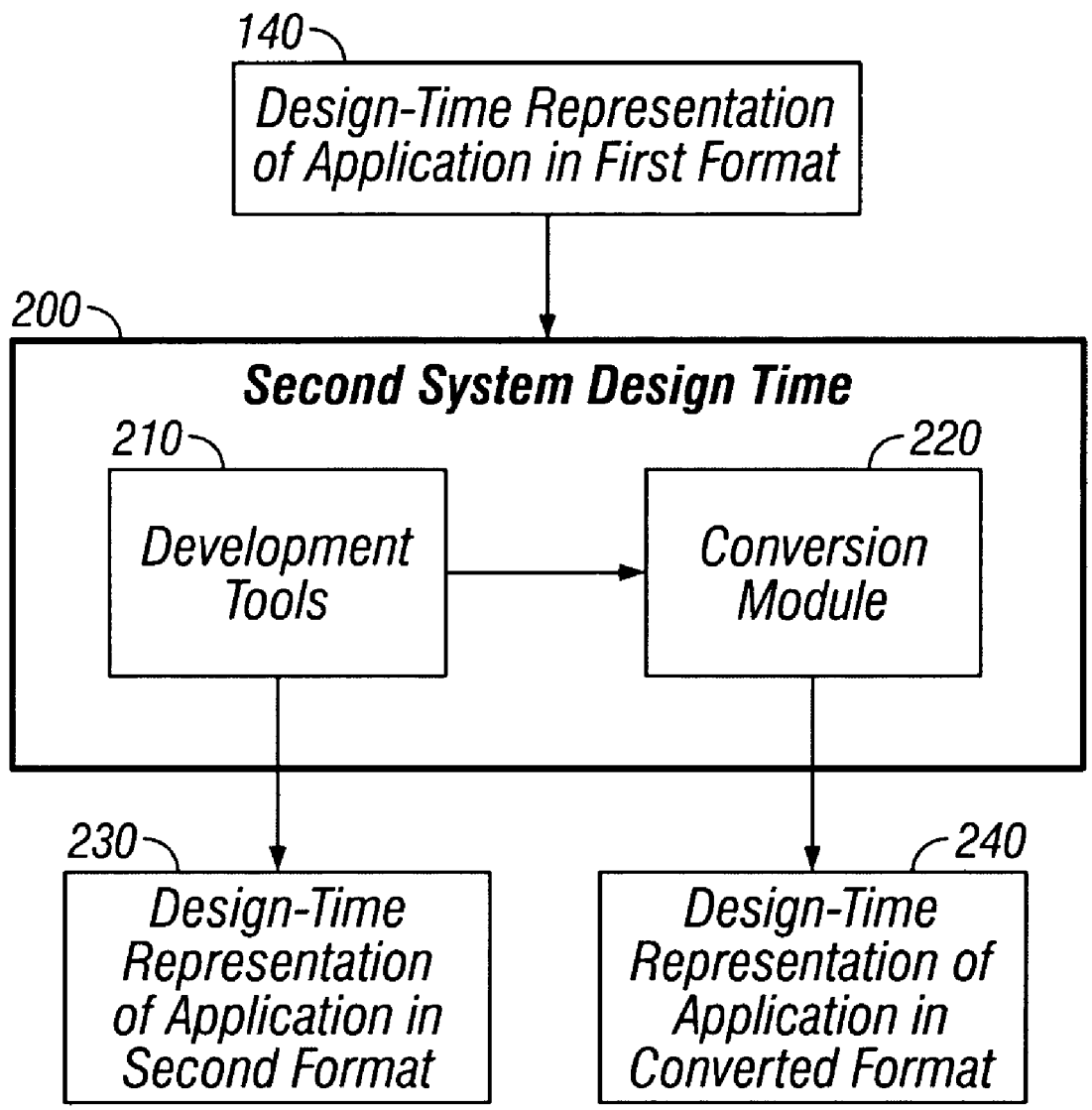
FIG. 2A is a block diagram of a second system in accordance with the invention.

As shown in FIG. 2A, a second system 200 at design time includes one or more development tools 210 and a conversion module 220. The development tools 210 are tools for developing a design-time representation of an application in a second application format 230. In one implementation, the second application format 230 is the Web Dynpro application format, also developed by SAP. The Web Dynpro application format includes views, models, and controllers, as explained in more detail below. Thus, in this implementation, the design-time representation of an application in the Web Dynpro format would include a specification of the models, views, and controllers of the application.

The conversion module 220 converts the design-time representation of an application in the first application format 140 to a design-time representation of the application in the converted application format 240. The converted application format 240 can be different from the second application format 230, but like the second application format 230, it can be used by the second system 200 to generate run-time code for the application. The converted application format 240 and the conversion technique will be described in more detail below.

Figure 2B:
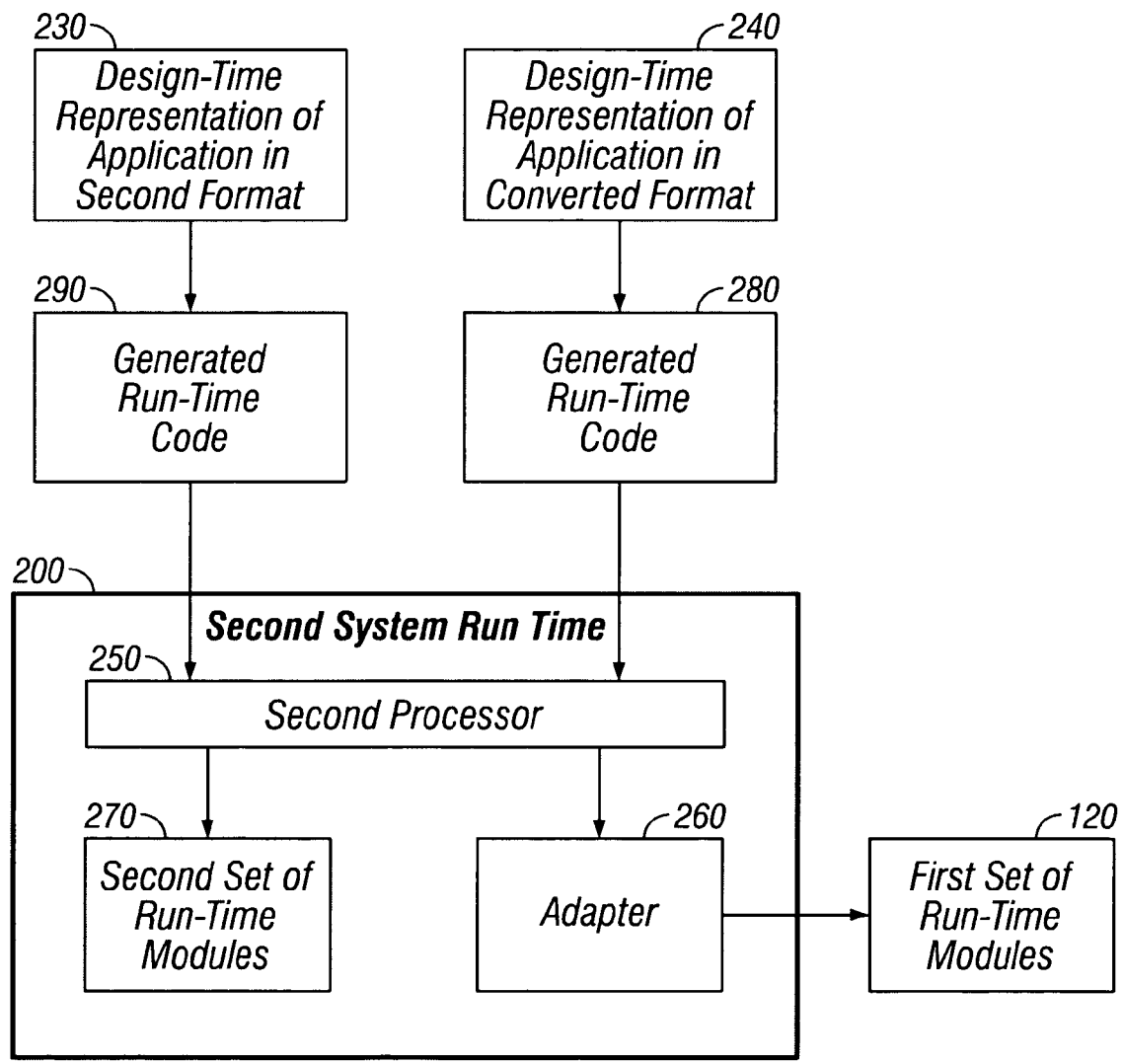
FIG. 2B is a block diagram of a second system in accordance with the invention.

At run time, as shown in FIG. 2B, the second system 200 includes a second run-time processor 250, an adapter 260, and a second set of run-time modules 270. The second run-time processor 250 is operable to execute both run-time code 280 generated from the design-time representation of the application in the converted application format 240 and run-time code 290 generated from the design-time representation of the application in the second application format 230.

The run-time code 280 can include calls to the first set of run-time modules 120. The second run-time processor 250 can execute these calls by using the adapter 260 to interface with the first set of run-time modules 120. Typically, in the first system 100, such calls would be made by the first run-time processor 110.

The following paragraphs describe one implementation of the invention. In this implementation, the first system 100 is a Web Application Server from SAP that includes a design-time and a run-time environment for developing client-server applications in an application format referred to as the Dynpro application format. Such a system will be referred to as a Dynpro Web Application Server. The second system 200 is a Web Application Server that includes a design-time and a run-time environment for developing web-based client-server applications in an application format referred to as the Web Dynpro application format. Such a system will be referred to as a Web Dynpro Web Application Server.

The Dynpro Application Format

An application designed in the Dynpro application format (a Dynpro application) includes one or more screens. Each screen includes one or more controls through which users can interact with the Dynpro application. The controls can include, for example, tables, text fields, radio buttons, trays, and drop-down menus. The controls can be arranged in a particular layout. For example, one possible layout is a hierarchical layout that includes a top-level control and one or more nested controls.

A Dynpro application also includes flow logic for the screens. The flow logic is processing logic that is associated with each screen. Such processing can include, for example, input help, input validation, and input format conversion.

Figure 3:
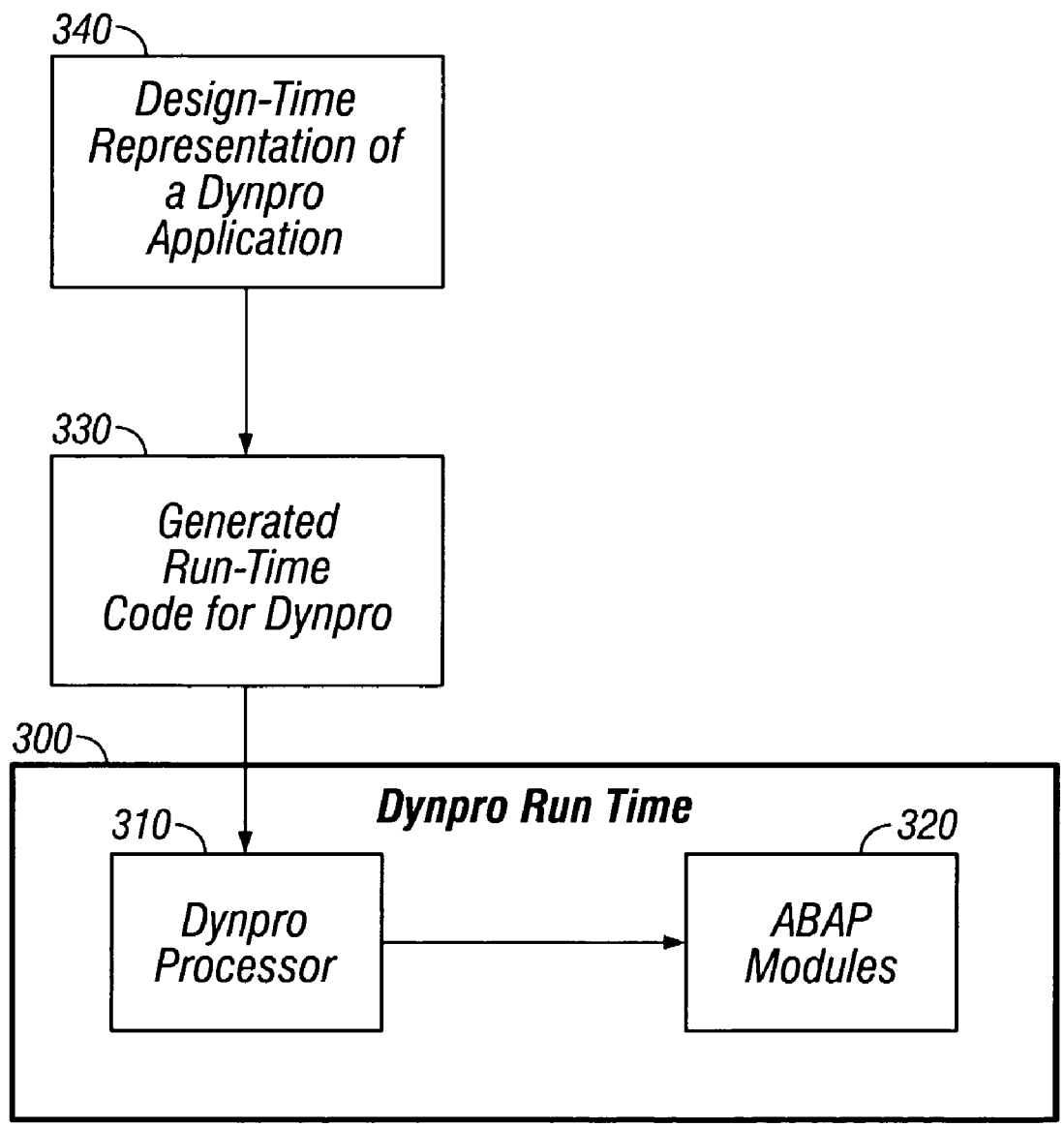
FIG. 3 is a block diagram of an implementation of the first system in accordance with the invention.

As shown in FIG. 3, the run-time environment 300 of the Dynpro Web Application Server includes a Dynpro run-time processor 310 and a set of ABAP modules 320. The Dynpro run-time processor 310 is operable to execute run-time code 330 generated based on a design-time representation of a Dynpro application. During execution of the run-time code 330, the Dynpro run-time processor 310 can invoke one or more of the ABAP modules 320 to provide enhanced application functionality, such as, for example, input validation and input formatting.

In one implementation, the execution of the Dynpro flow logic can be split into multiple phases that include the following phases:

PBO (Process Before Output) phase—The PBO phase occurs before a screen is displayed to a user. The flow logic that is executed during the PBO phase can include logic that initializes controls on the screen.

PAI (Process After Input) phase—The PAI phase occurs after a user has submitted data for the screen. The flow logic that is executed during the PAI phase can include logic that validates user input, or converts the format of input data.

POH (Process On Help) phase—The POH phase occurs when a user requests help information for a control. The flow logic that is executed during the POH phase can include logic that displays help information for the control.

POV (Process On Value) phase—The POV phase occurs when a user requests input help for a control. The flow logic that is invoked during the POV phase can include logic that displays a list of the valid input values for the control and allows the user to select one of the values from the list rather than entering the input from scratch.

The Web Dynpro Application Format

An application designed in the Web Dynpro application format (a Web Dynpro application) is designed according to the model-view-controller (MVC) programming model. A Web Dynpro application includes one or more application models, one or more views that present the models, and one or more controllers that manipulate the models in response to user interaction with the views. Each controller can also have associated data structures for storing data used by the controllers.

Figure 4A:
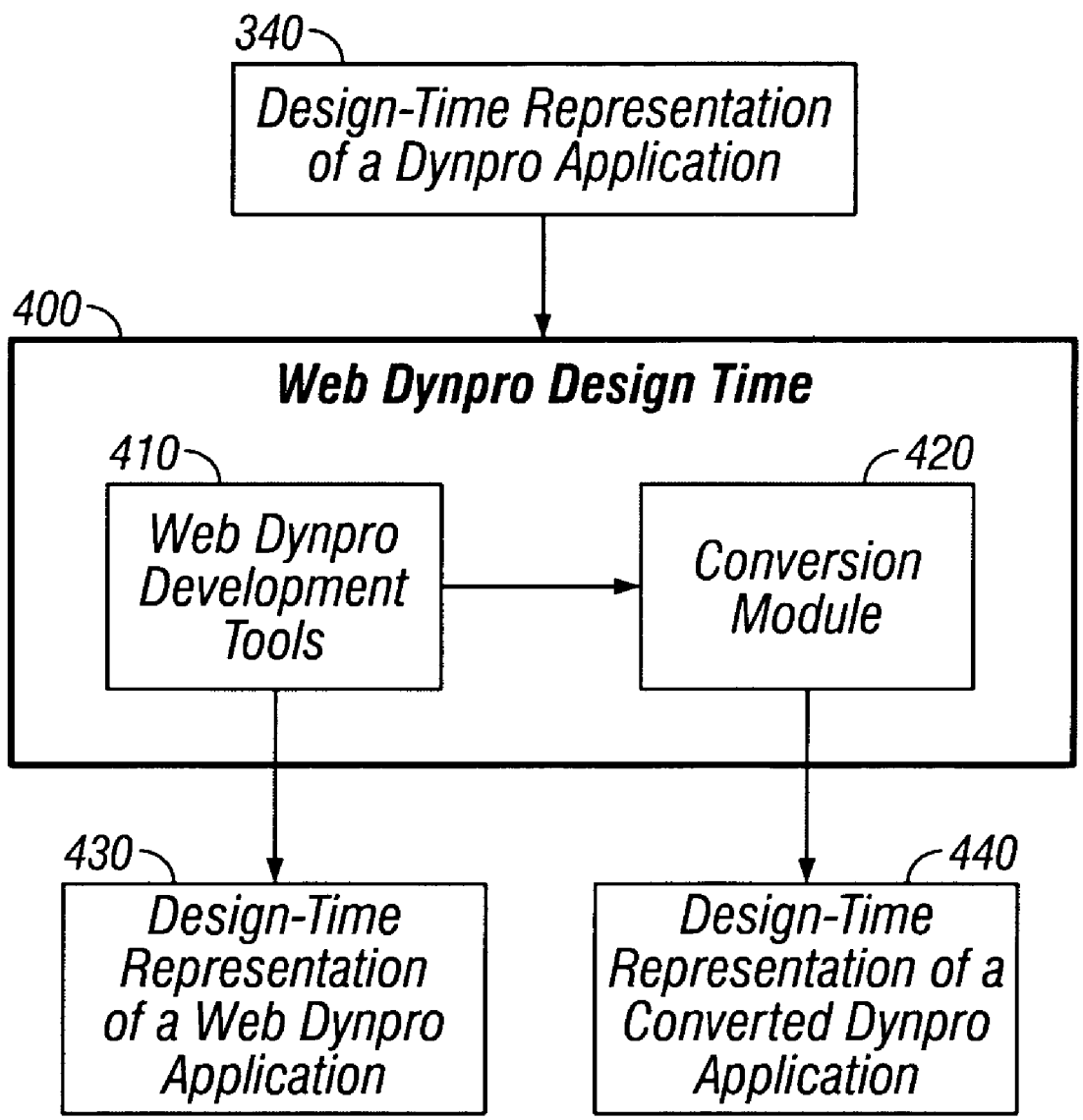
FIG. 4A is a block diagram of an implementation of the second system in accordance with the invention.

As shown in FIG. 4A, the design-time environment 400 of the Web Dynpro Web Application Server includes a set of Web Dynpro development tools 410 and a conversion module 420. The development tools 410 are tools for developing a design-time representation of a Web Dynpro application 430, and can include, for example, tools for designing the content and layout of the views. The development tools can be based on a Web Dynpro metamodel that defines the set of objects (metamodel objects) that can be used in the design of a Web Dynpro application. The metamodel objects can include, for example, models, views, controllers, contexts, and controls. The design-time representation of a Web Dynpro application is stored as metadata in a metadata repository and is used to generate run-time code for different platforms, for example, Java (e.g., J2EE), ABAP, or Microsoft NET platforms.

The conversion module 420 converts a design-time representation of an application in the Dynpro application format 340 to a design-time representation of the application in a converted application format 440. The converted application format 440 can be different from the Web Dynpro application format 330, but as with the Web Dynpro application format 330, a design-time representation in the converted format 440 can be used to generate application run-time code that can be executed in the run-time environment of the Web Dynpro Web Application Server.

Figure 5:
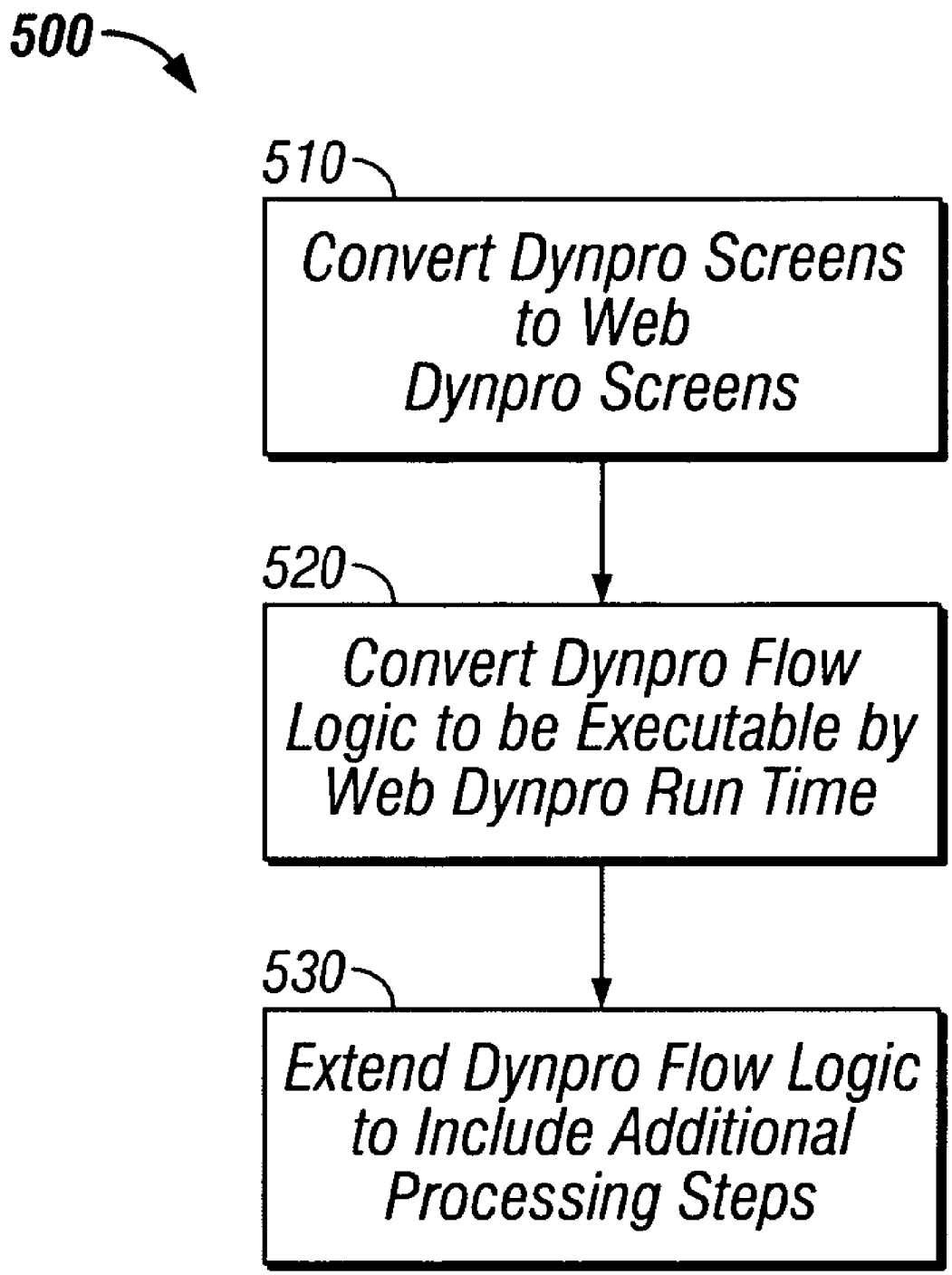
FIG. 5 is a flow diagram of a method for converting applications in accordance with the invention.
Figure 6A:
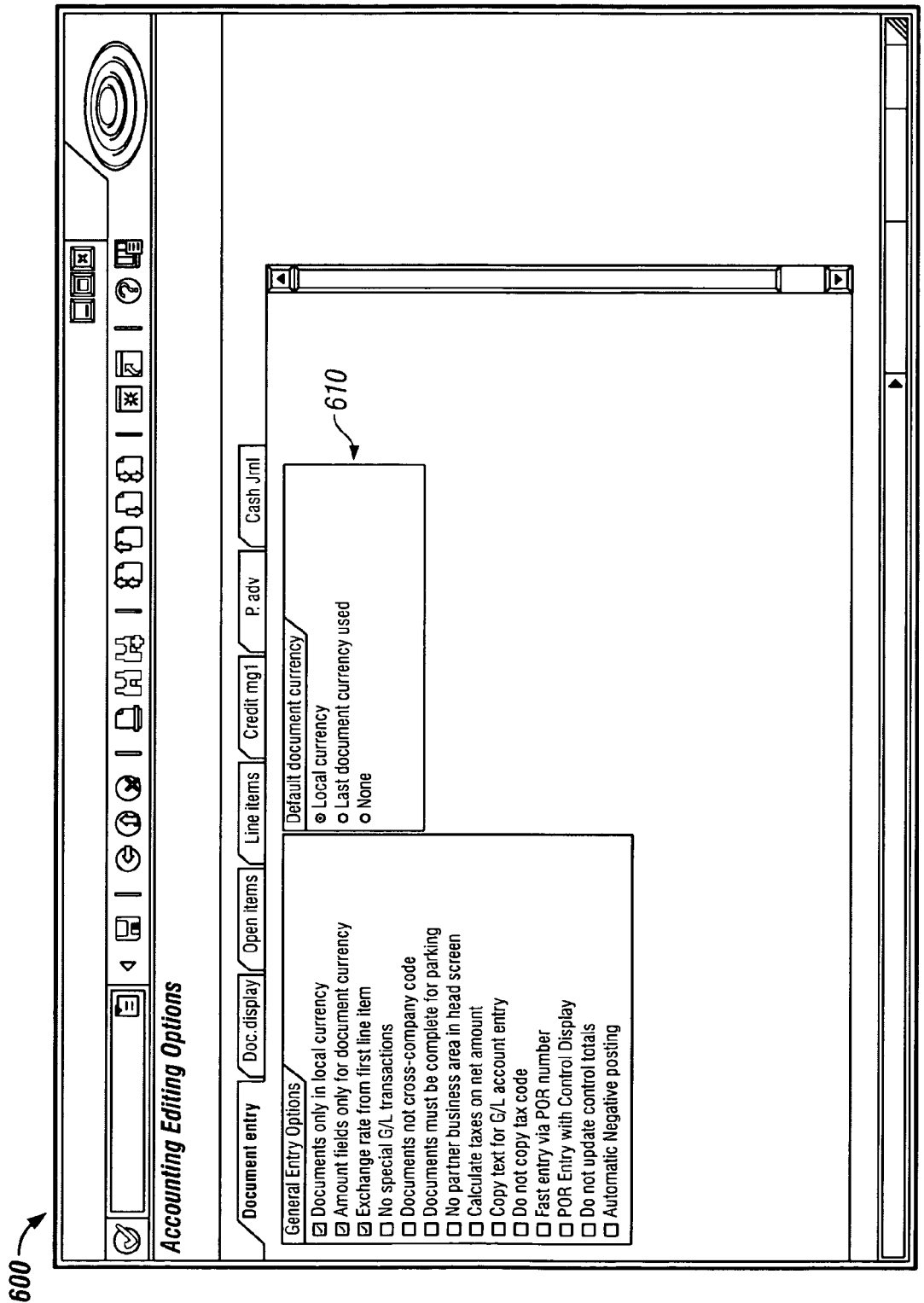
FIG. 6A is a screen shot of an application screen before conversion.
Figure 6B:
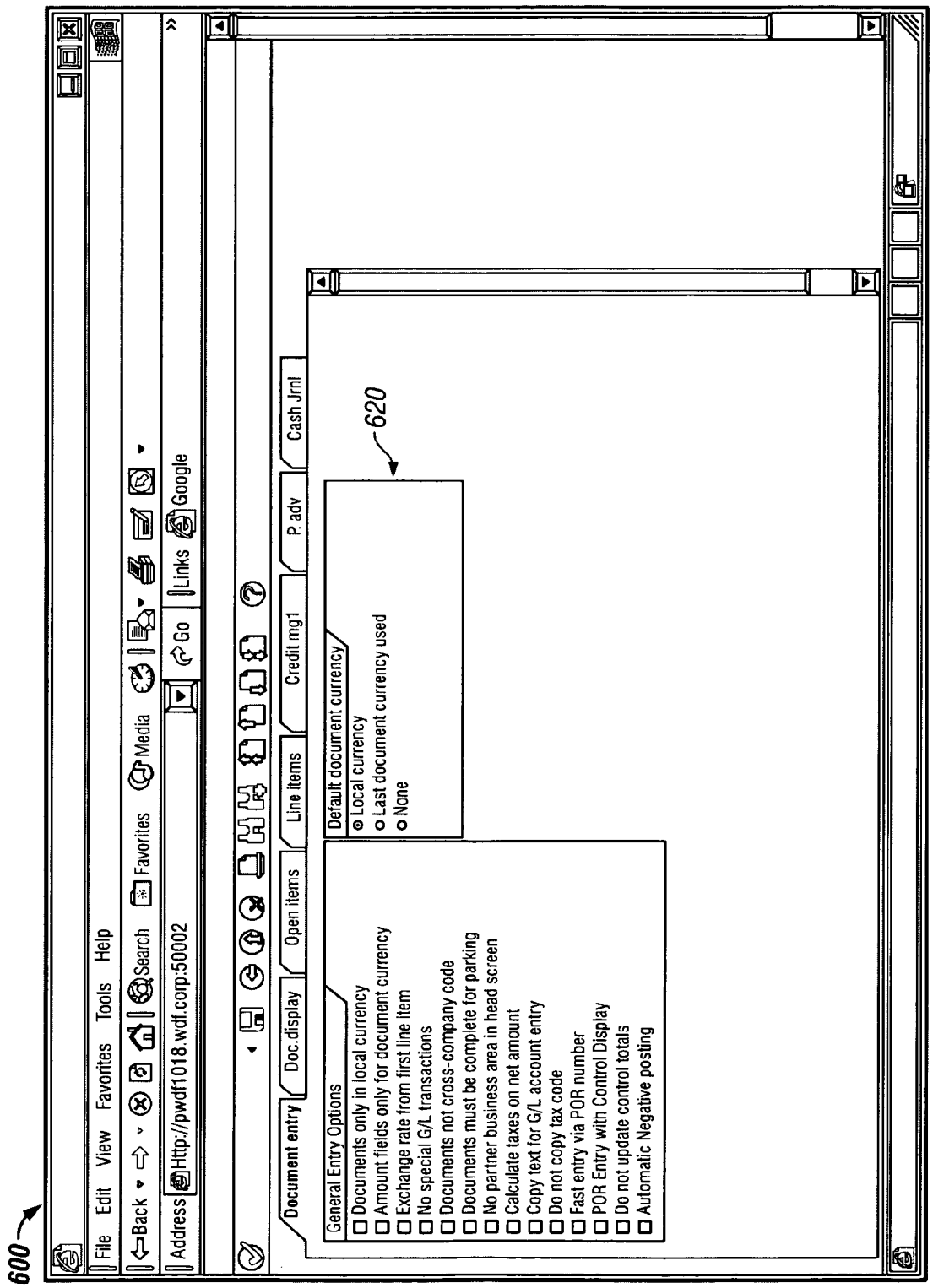
FIG. 6B is a screen shot of an application screen after conversion.

In operation, as shown in FIG. 5, the conversion module 420 converts each screen in a Dynpro application to a view in the Web Dynpro format (step 510). In generating the Web Dynpro views, the conversion module attempts to match the layout of UI elements in the Dynpro screen. For each control in each Dynpro screen, the conversion module creates a corresponding Web Dynpro metamodel object. The corresponding Web Dynpro metamodel object can be created, for example, by selecting the Web Dynpro metamodel object that best matches the Dynpro control and configuring the metamodel object so that its attributes match the attributes of the Dynpro control. For example, in the case of a Dynpro button that has a color attribute set to "blue", the conversion process can select a Web Dynpro button control and set its color to blue. Although in some cases the conversion can be a straightforward one-to-one replacement (e.g., replacing a Dynpro checkbox with a Web Dynpro checkbox), the conversion can be more complicated in other cases. For example, as shown in FIGS. 6A and 6B, multiple checkboxes 610 in a Dynpro screen 600 can be converted into a single Web Dynpro radio button 620 with multiple selection buttons.

Figure 4B:
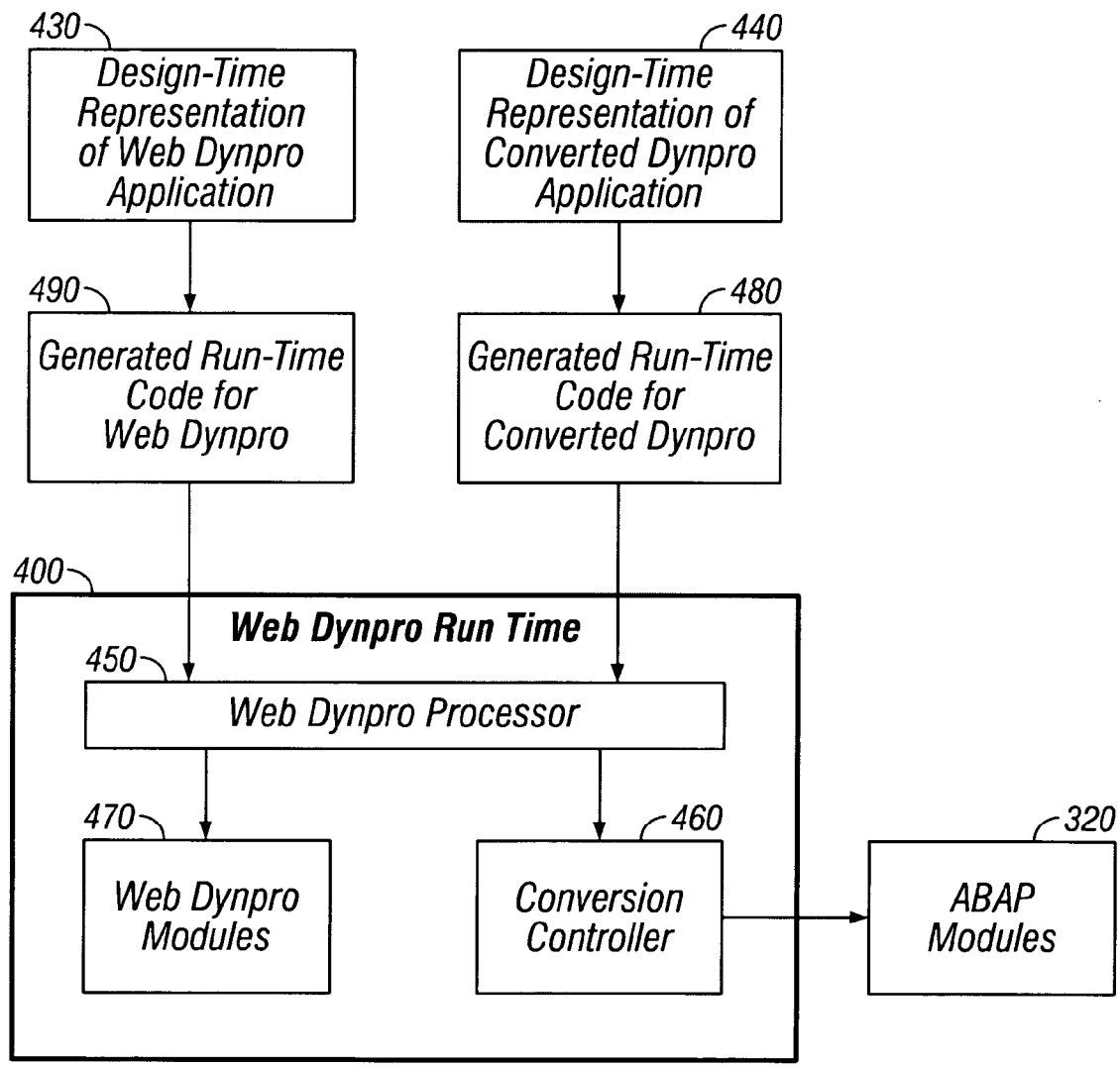
FIG. 4B is a block diagram of an implementation of the second system in accordance with the invention.

The conversion module also converts the Dynpro flow logic into processing logic that is compatible with the Web Dynpro application format (i.e., that is executable by the Web Dynpro run time) (step 520). The flow logic that is converted can include state control logic that keeps track of the state of application execution. The conversion of the flow logic can also include replacing calls to the ABAP modules 320 with calls to a conversion controller 460 (FIG. 4B). The calls to the conversion controller 460 can be encapsulated in macros.

The conversion of the flow logic can further include extending the original flow logic with additional processing logic (step 530). Such additional processing logic can take the form of instructions to the conversion controller 460 to perform one or more functions that are not performed by the original flow logic. Such functions can include, for example, validating user input or converting the format of user input.

FIG. 7A shows an example of flow logic in the Dynpro application format prior to conversion, and FIG. 7B shows the Dynpro flow logic after conversion. In this implementation, the syntax of the converted Dynpro flow logic resembles the syntax of the original Dynpro flow logic. This makes it easier for application developers that are used to the Dynpro syntax to make modifications to the converted Dynpro application. In this example, all the MODULE statements 710 are converted into WDP_MODULE statements 720, which are macros that expand to the actual converted code. The following is an example of the actual converted code for the WDP_MODULE statements 720:

```
if Cl_Dynp=>tmp_exco eq abap_true      //if an exit-command
    cl_dynp=>call_module('&l')         //then call the application module
else
```

```
add 1 to cl_dynp=>the_model->statement         //update the statement counter
  if cl_dynp=>the_model->currcont eq           //if the statement counter equals the
      cl_dynp=>the_model->statement            //current statement number
      cl_dynp=>call_module('&1')               //then call the application module
      add 1 to cl_dynp=>the_model->currcont    //update the statement counter
  endif
endif
```

Once the conversion is completed, the design-time representation of the application in the converted format can be stored as Web Dynpro metadata in the metadata repository. The metadata can be subsequently edited using the Web Dynpro development tools, or used to generate run-time code for the Web Dynpro run time.

As shown in FIG. 4B, the Web Dynpro run time 400 includes a Web Dynpro run-time processor 450, a conversion controller 460, and a set of Web Dynpro modules 470. The Web Dynpro run-time processor 250 is operable to execute both run-time code 490 for a Web Dynpro application, as well as run-time code 480 for a converted Dynpro application (i.e., run-time code generated from the design-time representation of the application in the converted format). The Web Dynpro run-time processor 450 can include a phase handling mechanism that splits the execution of an application into multiple run-time phases. The phases can differ depending on whether the application being executed is a Web Dynpro application or a converted Dynpro application. For example, in the case of a Web Dynpro application, the Web Dynpro run-time processor 450 can split the execution into a "parse browser request" phase, a "validate input" phase, and a "send response to browser" phase. In the case of a converted Dynpro application, the Web Dynpro run-time processor 450 can split the execution into the PBO, PAI, POH, and POV phases described above.

Figure 8:
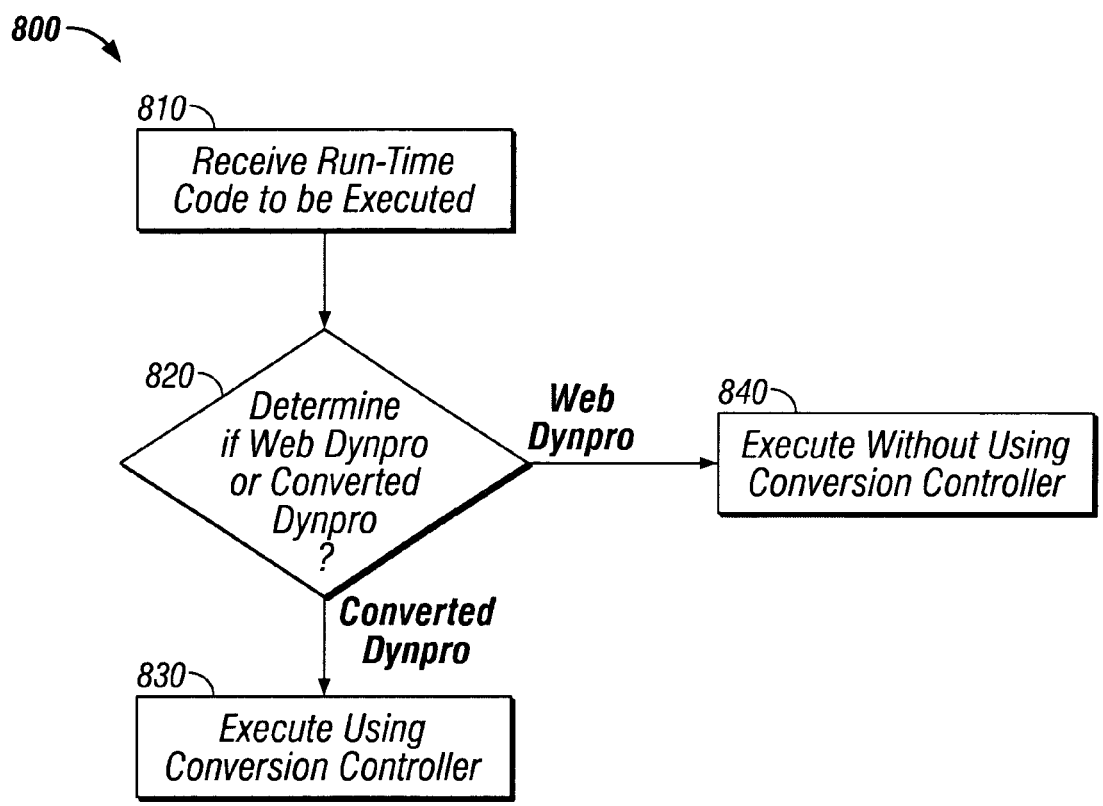
FIG. 8 is a flow diagram of a method for executing converted applications in accordance with the invention.

In operation, as shown in FIG. 8, the Web Dynpro run-time processor 450 receives run-time code for an application to be executed (step 810). The Web Dynpro run-time processor then determines whether the application to be executed is a Web Dynpro application or a converted Dynpro application (step 820). The code for the converted Dynpro application can include a flag that identifies the application as being a converted Dynpro application.

If the application is a Web Dynpro application, then the Web Dynpro run-time processor executes the code directly (step 830), without using the conversion controller. If the application is a converted Dynpro application, then the Web Dynpro run-time processor executes the code using the conversion controller (step 840), for example, by using the conversion controller to invoke the ABAP modules 320.

The invention can be implemented in digital electronic circuitry, or in computer hardware, firmware, software, or in combinations of them. The invention can be implemented as a computer program product, i.e., a computer program tangibly embodied in an information carrier, e.g., in a machine-readable storage device or in a propagated signal, for execution by, or to control the operation of, data processing apparatus, e.g., a programmable processor, a computer, or multiple computers. A computer program can be written in any form of programming language, including compiled or interpreted languages, and it can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

Method steps of the invention can be performed by one or more programmable processors executing a computer program to perform functions of the invention by operating on input data and generating output. Method steps can also be performed by, and apparatus of the invention can be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in special purpose logic circuitry.

To provide for interaction with a user, the invention can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

The invention can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the invention, or any combination of such back-end, middleware, or front-end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

The invention has been described in terms of particular embodiments. Other embodiments are within the scope of the following claims. For example, the steps of the invention can be performed in a different order and still achieve desirable results.

What is claimed is:

1. A computer program product, tangibly embodied in a machine-readable storage device, the computer program product being operable to cause data processing apparatus to perform operations comprising:

receiving run-time code for an application, the run-time code being generated from a converted design-time representation of the application, the run-time code comprising a flag indicating that the run-time code was generated from the converted design-time representation, wherein:

the converted design-time representation of the application is generated from an original design-time representation of the application developed for use in a first run-time environment for executing applications having been developed in a first design-time environment, the converted design-time representation is stored as metadata in a metadata repository, the converted design-time representation having been developed by a development tool based on a metamodel that defines metamodel objects, the first design-time environment using a first programming model comprising one or more first model elements including screens and processing logic for each screen, the original design-time representation including one or more application screens and original processing logic for each application screen, the original processing logic including a call to a run-time module in the first run-time environment; and the converted design-time representation of the application is for use in a second run-time environment for executing applications having been developed in a second design-time environment, the second design-time environment using a second programming model comprising one or more second model elements including models, views, and controllers, the converted design-time representation of the application including one or more application views based on the one or more application screens, and converted processing logic based on the original processing logic, the converted processing logic being a design-time representation used to generate run-time code for the original processing logic, the run-time code for the original processing logic is configured to be executed in the second run-time environment; and executing the run-time code in the second run-time environment using an adapter operable to interface with the run-time module in the first run-time environment, comprising using the adapter to perform a function comprising input validation not performed by the original processing logic.

2. The computer program product of claim 1, wherein the first programming model is the SAP Dynpro programming model and the second programming model is the SAP Web Dynpro programming model.

3. The computer program product of claim 1, wherein the function comprises input formatting.

4. The computer program product of claim 1, wherein:
the original design-time representation of the application comprises original state control logic; and
the converted design-time representation of the application comprises converted state control logic based on the original state control logic, the converted state control logic capable of being executed by the adapter.

5. The computer program product of claim 1, wherein:
the original design-time representation of the application comprises one or more controls from a first set of controls;
the converted design-time representation of the application comprises one or more controls from a second set of controls, each control in the converted design-time representation of the application corresponding to a control in the original design-time representation of the application; and
executing the run-time code comprises rendering the controls in the converted design-time representation of the application.

6. A computer program product, tangibly embodied in a machine-readable storage device, the computer program product being operable to cause data processing apparatus to perform operations comprising:

receiving run-time code for an application, the run-time code comprising a flag indicating whether the run-time code was generated from a native design-time representation or a converted design-time representation;

determining whether the run-time code was generated from the native design-time representation of the application or from the converted design-time representation of the application based on the flag, wherein:

the native design-time representation of the application is for use in a first run-time environment for executing applications having been developed in a first design-time environment, the first design-time environment using a first programming model comprising one or more first model elements including models, views, and controllers; and the converted design-time representation of the application is generated from an original design-time representation of the application developed for use in a second run-time environment for executing applications having been developed in a second design-time environment, the converted design-time representation is stored as metadata in a metadata repository, the converted design-time representation having been developed by a development tool based on a metamodel that defines metamodel objects, the second design-time environment using a second programming model comprising one or more second model elements including screens and processing logic for each screen, the original design-time representation including one or more application screens and original processing logic for each application screen, the converted design-time representation of the application including one or more application views based on the one or more application screens, and converted processing logic based on the original processing logic, the converted processing logic being a design-time representation used to generate run-time code for the original processing logic, the run-time code for the original processing logic is configured to be executed in the second run-time environment;

if the run-time code was generated from the native design-time representation, executing the run-time code in the first run-time environment using a set of run-time modules in the first run-time environment; and if the run-time code was generated from the converted design-time representation, executing the run-time code in the first run-time environment using an adapter operable to interface with a set of run-time modules in the second run-time environment, comprising using the adapter to perform a function including input validation not performed by the original processing logic.

7. The computer program product of claim 6, wherein the first programming model is the SAP Web Dynpro programming model and the second programming model is the SAP Dynpro programming model.

8. The computer program product of claim 6, wherein:
executing the run-time code using the set of run-time modules in the first run-time environment comprises using a first sequence of process steps; and
executing the run-time code using the set of run-time modules in the second run-time environment comprises using a second sequence of process steps.

9. An apparatus comprising:
means for receiving run-time code for an application, the run-time code being generated from a converted design-time representation of the application, the run-time code comprising a flag indicating that the run-time code was generated from the converted design-time representation, wherein:
the converted design-time representation of the application is generated from an original design-time representation of the application developed for use in a first run-time environment for executing applications having been developed in a first design-time environment, the converted design-time representation is stored as metadata in a metadata repository, the converted design-time representation having been developed by a development tool based on a metamodel that defines metamodel objects, the first design-time environment using a first programming model comprising one or more first model elements including screens and processing logic for each screen, the original design-time representation including one or more application screens and original processing logic for each application screen, the original processing logic including a call to a run-time module in the first run-time environment; and
the converted design-time representation of the application is for use in a second run-time environment for executing applications having been developed in a second design-time environment, the second design-time environment using a second programming model comprising one or more second model elements including models, views, and controllers, the converted design-time representation of the application including one or more application views based on the one or more application screens, and converted processing logic based on the original processing logic, the converted processing logic being a design-time representation used to generate run-time code for the original processing logic, the run-time code for the original processing logic is configured to be executed in the second run-time environment; and
means for executing the run-time code in the second run-time environment using an adapter operable to interface with the run-time module in the first run-time environment, comprising means for using the adapter to perform a function including input validation not performed by the original processing logic.

10. The apparatus of claim 9, wherein the first programming model is the SAP Dynpro programming model and the second programming model is the SAP Web Dynpro programming model.

11. The apparatus of claim 9, wherein:
the original design-time representation of the application comprises original state control logic; and
the converted design-time representation of the application comprises converted state control logic based on the original state control logic, the converted state control logic capable of being executed by the adapter.

12. A method comprising:
receiving run-time code for an application, the run-time code being generated from a converted design-time representation of the application, the run-time code comprising a flag indicating that the run-time code was generated from the converted design-time representation, wherein:
the converted design-time representation of the application is generated from an original design-time representation of the application developed for use in a first run-time environment for executing applications having been developed in a first design-time environment, the converted design-time representation is stored as metadata in a metadata repository, the converted design-time representation having been developed by a development tool based on a metamodel that defines metamodel objects, the first design-time environment using a first programming model comprising one or more first model elements including screens and processing logic for each screen, the original design-time representation including one or more application screens and original processing logic for each application screen, the original processing logic including a call to a run-time module in the first run-time environment; and
the converted design-time representation of the application is for use in a second run-time environment for executing applications having been developed in a second design-time environment, the second design-time environment using a second programming model comprising one or more second model elements including models, views, and controllers, the converted design-time representation of the application including one or more application views based on the one or more application screens, and converted processing logic based on the original processing logic, the converted processing logic being a design-time representation used to generate run-time code for the original processing logic, the run-time code for the original processing logic is configured to be executed in the second run-time environment; and
executing the run-time code in the second run-time environment using an adapter operable to interface with the run-time module in the first run-time environment, comprising using the adapter to perform a function including input validation not performed by the original processing logic.

13. The method of claim 12, wherein the first programming model is the SAP Dynpro programming model and the second programming model is the SAP Web Dynpro programming model.

14. The method of claim 12, wherein:
the original design-time representation of the application comprises original state control logic; and
the converted design-time representation of the application comprises converted state control logic based on the original state control logic, the converted state control logic capable of being executed by the adapter.

* * * * *

UNITED STATES PATENT AND TRADEMARK OFFICE
CERTIFICATE OF CORRECTION

| | | |
|---|---|---|
| PATENT NO. | : 7,543,280 B2 | Page 1 of 1 |
| APPLICATION NO. | : 10/658593 | |
| DATED | : June 2, 2009 | |
| INVENTOR(S) | : Rosenthal et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1007 days.

Signed and Sealed this
First Day of March, 2011

David J. Kappos
*Director of the United States Patent and Trademark Office*